(12) United States Patent
Burrell et al.

(10) Patent No.: US 7,170,006 B1
(45) Date of Patent: Jan. 30, 2007

(54) BATTERY CONTACT MECHANISM INCLUDING SINGLE-PIECE BATTERY CONTACT SPRING

(75) Inventors: Jonathan C. Burrell, Olathe, KS (US); John B. Whiteside, Lenexa, KS (US); Chi-Min Lin, Sijr (TW)

(73) Assignee: Garmin Ltd. (KY)

( * ) Notice: Subject to any disclaimer, the term of this patent is extended or adjusted under 35 U.S.C. 154(b) by 76 days.

(21) Appl. No.: 10/701,770

(22) Filed: Nov. 5, 2003

(51) Int. Cl.
*H01R 4/18* (2006.01)

(52) U.S. Cl. .................................. 174/94 R; 439/754

(58) Field of Classification Search ............. 174/94 R, 174/135; 429/179; 439/754
See application file for complete search history.

(56) References Cited

U.S. PATENT DOCUMENTS

| | | | | |
|---|---|---|---|---|
| 3,835,310 A | * | 9/1974 | Koder | ........................ 362/200 |
| 4,117,203 A | * | 9/1978 | Sjogren | ........................ 429/7 |
| 5,594,220 A | * | 1/1997 | Hackbarth et al. | .......... 200/6 B |
| 5,709,574 A | * | 1/1998 | Bianca et al. | ................ 439/858 |
| 5,909,102 A | * | 6/1999 | Stone, III et al. | ........... 320/114 |
| 6,554,657 B1 | * | 4/2003 | Krause et al. | .............. 439/773 |

* cited by examiner

*Primary Examiner*—Jinhee Lee
(74) *Attorney, Agent, or Firm*—David L. Terrell

(57) ABSTRACT

A battery contact mechanism (10) including a battery contact spring (12) for electrically connecting a battery (24) with electronic componentry (20) within a battery-powered device (14), such as, for example, a portable, hand-held GPS unit or personal digital assistant (PDA). The battery contact mechanism (10) includes a single-piece battery contact spring (12), including a center section (34), an upper tang (36) for contacting the battery (24), and a lower tang (38) for contacting the electronic componentry (20); a post or rib projection (28) for securing the spring (12) within the device (14); and a sealant reservoir (30) for preventing leakage of moisture or other substances to the electronic componentry (20).

22 Claims, 2 Drawing Sheets

BATTERY CONTACT MECHANISM INCLUDING SINGLE-PIECE BATTERY CONTACT SPRING

BACKGROUND OF THE INVENTION

1. Field of the Invention

The present invention relates broadly to mechanisms for achieving and maintaining battery contact within a battery-powered device. More particularly, the present invention relates to a battery contact mechanism including a single-piece battery contact spring, a post projection, and a sealant reservoir for use in a battery-powered device to provide a reliable electrical connection between a battery and electronic componentry within the battery-powered device.

2. Description of the Prior Art

In a battery-powered device it is necessary to reliably transfer power between a battery and a circuit board or other electronic componentry. Typically, this is accomplished with a multi-piece battery contact mechanism comprising at least a contact plate for the battery, a contact pad or plate for the electronic componentry, and a wire extending between and soldered to the contact plate and pad. Unfortunately, the multi-piece mechanism suffers from a number of problems and disadvantages, including, for example, that the connections (i.e., solder joints) between the various pieces are weak points that can fail due to overstraining or jarring, thereby breaking the electrically-conductive pathway or connection or otherwise adversely affecting operation of the device. Furthermore, the battery contact plate and wire are often not sufficiently secured within the device so that they loosen and move over time, thereby further adversely affecting operation. Additionally, prior art battery contact mechanisms often do not provide a sufficient seal against moisture. More specifically, moisture or other undesirable substances often travel on, along, or beside the wire between a battery compartment or cavity wherein the battery is located to a main compartment wherein the electronic componentry is located, thereby exposing the electronic componentry to damage.

Due to the above-identified and other problems and disadvantages in the prior art, a need exists for an improved battery contact mechanism.

SUMMARY OF THE INVENTION

The present invention overcomes the problems and disadvantages in the prior art by providing a battery contact mechanism for use in a battery-power electronic device, such as, for example, a portable, hand-held global positioning system (GPS) unit or personal digital assistant (PDA). The device may include a two piece clam-shell housing providing a main compartment for housing a circuit board or other electronic componentry and a battery compartment for receiving one or more batteries for powering the electronic componentry. The mechanism advantageously provides improved contact characteristics between the battery and electronic componentry; improved ruggedness; and improved water resistance over prior art mechanisms.

In a first preferred embodiment, the mechanism broadly comprises a single-piece battery contact spring; a post or rib projection; and a sealant reservoir. The spring includes a center portion; an upper tang; and a lower tang. The spring may be constructed from a single piece of stainless steel or any other suitable electrically-conductive material. The center portion is adapted to securely attach to the post projection and to support and maintain the upper and lower tangs in their normal operating orientation and condition. The center portion includes a toothed opening adapted to fit over and securely engage the post projection which is securely associated with the housing of the device. More specifically, the teeth of the opening bend to allow the post projection to enter the opening and then physically engage the post projection to prevent it from thereafter being withdrawn from the opening.

The upper tang extends from the center portion into the battery compartment and is adapted to achieve and maintain spring-biased physical contact with the battery. The upper tang may present a stop or limiter that functions to limit the amount by which the upper tang may be compressed by the battery.

The lower tang extends from the center portion into the main compartment and is adapted to achieve and maintain spring-biased physical contact with the electronic componentry. The lower tang may present a pad that functions to increase surface area contact with the electronic componentry.

The sealant reservoir provides improved moisture resistance by allowing for substantially surrounding at least a portion of the lower tang with sealant. More specifically, the sealant reservoir is a substantially defined space through which the lower tang extends and which can be filled with a sealant material so as to avoid or substantially eliminate leaks between the battery compartment and the main compartment that might otherwise damage the electronic componentry.

In a second preferred embodiment, the mechanism is substantially similar to the mechanism of the first preferred embodiment, except that it also includes two pairs of L-shaped securing brackets positioned proximate to and on opposing sides of a post or rib projection. Additionally, a center portion of a spring of the second preferred embodiment includes upturned flanges. Unlike the first preferred embodiment, an opening in the center portion is not toothed but rather has smooth edges.

The center portion of the spring is adapted to fit around the post or rib projection and to securely attach and mate within the two pairs of L-shaped brackets. More specifically, the two pairs of L-shaped brackets are selectively spaced to accommodate the upturned flanges. The opening of the center portion fits over the post, and the upturned flanges snap between the L-shaped brackets.

It will be appreciated that the battery contact mechanism of the present invention provides a number of substantial advantages over the prior art, including, for example, a more reliable, rugged, and water resistant connection between the battery and electronic componentry within the battery-powered device. More specifically, the spring is constructed from a single piece of material, rather than the solder-connected plate, wire, and pad of the prior art, and therefore substantially eliminates problems arising from joint failure. Furthermore, the spring is secured within the housing by the teeth of the toothed opening engaging the post projection, as in the first preferred embodiment, or by the upturned flanges positioned between the L-shaped securing brackets, as in the second preferred embodiment, thereby avoiding problems arising from the spring becoming loose within the housing. Additionally, the sealant reservoir allows for substantially sealing the main compartment from the battery compartment, thereby avoiding moisture or other substances leaking therebetween.

These and other important features of the present invention are more fully described in the section titled DETAILED DESCRIPTION OF A PREFERRED EMBODIMENT, below.

BRIEF DESCRIPTION OF THE DRAWINGS

Preferred embodiments of the present invention are described in detail below with reference to the attached drawing figures, wherein.

DETAILED DESCRIPTION OF A PREFERRED EMBODIMENT

Figure 1:
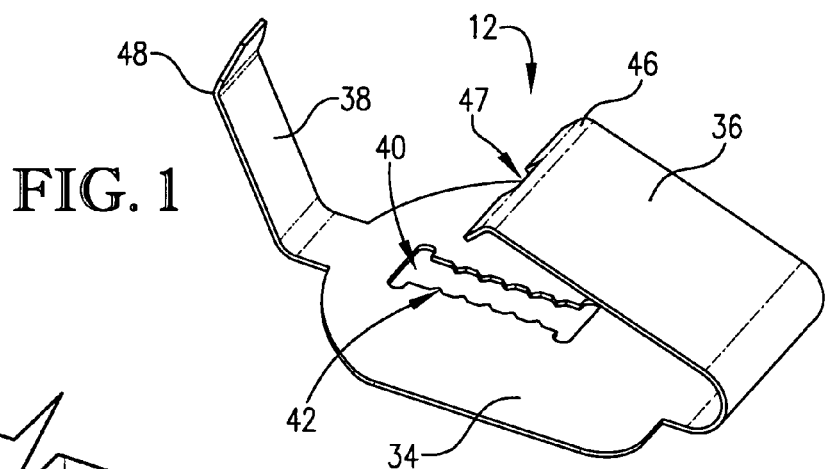
FIG. 1 is an isometric view of a battery contact spring component of a first preferred embodiment of a battery contact mechanism of the present invention.
Figure 2:
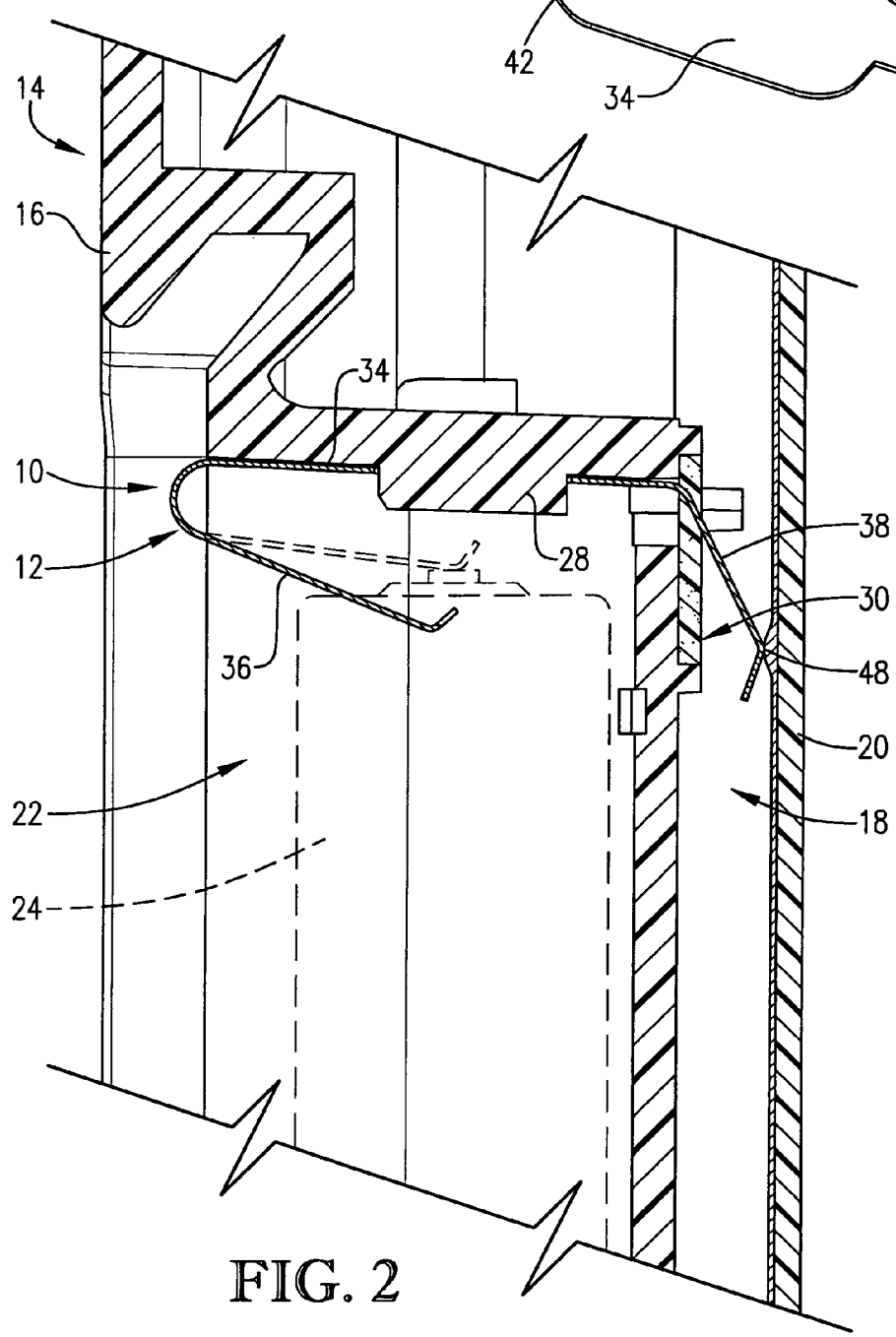
FIG. 2 is a fragmentary sectional view of the first preferred embodiment of the battery contact mechanism installed within an electronic device, wherein a battery and a compressed position of the battery contact spring of FIG. 1 are shown in broken line.

With reference to the drawing figures, a battery contact mechanism 10 including a single-piece battery contact spring 12 is herein described, shown, and otherwise disclosed in accordance with a first preferred embodiment of the present invention. The mechanism 10 may be incorporated into substantially any battery-powered device 14, such as, for example, a portable, hand-held GPS unit or PDA. Such devices 14 typically have a two piece clam-shell housing 16 providing a main compartment 18 for housing a circuit board or other electronic componentry 20 and a battery compartment 22 for receiving one or more batteries 24 for powering the electronic componentry 20. The mechanism 10 advantageously provides improved contact characteristics; improved ruggedness; and improved water resistance over prior art mechanisms.

Figure 3:
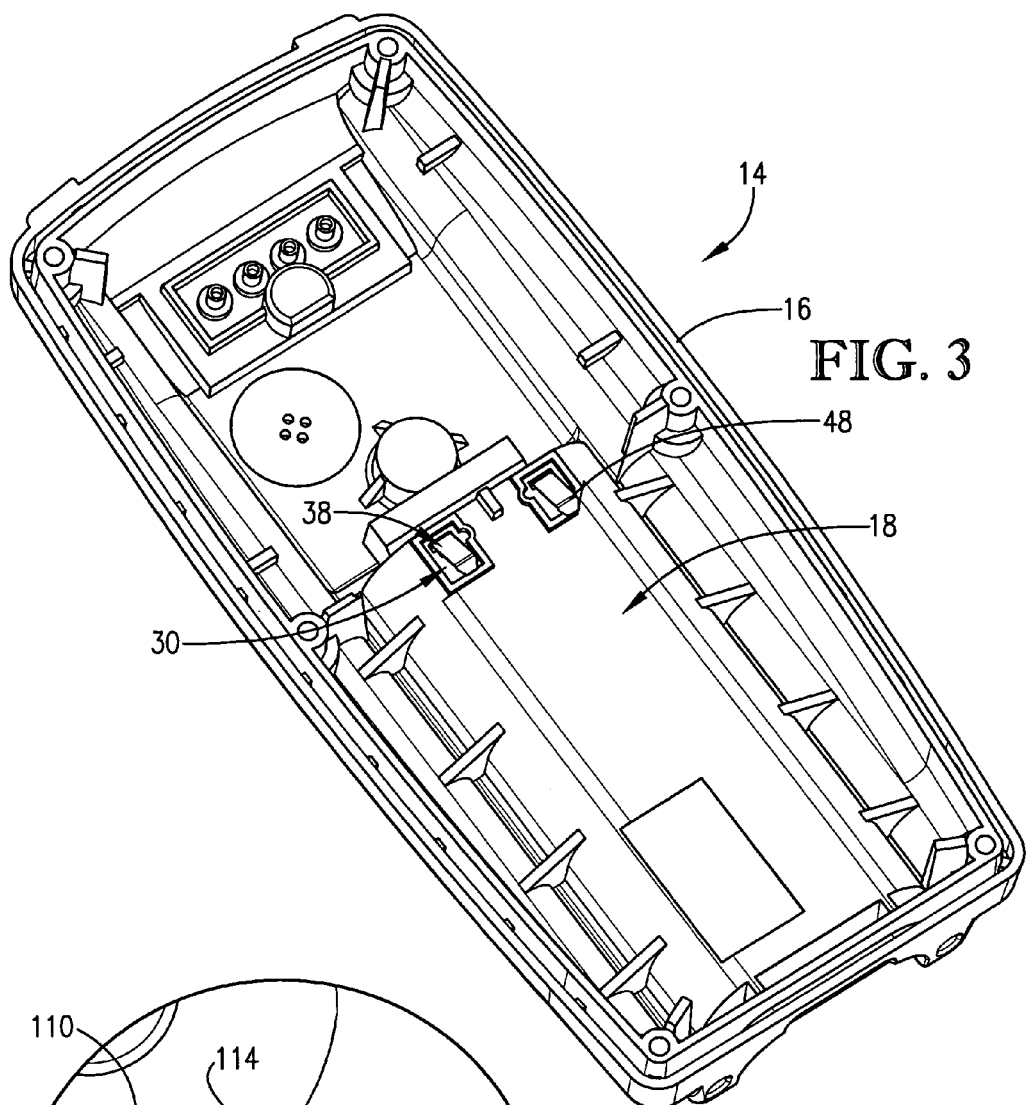
FIG. 3 is an isometric view of a bottom portion of one half of a housing of the electronic device of FIG. 2 wherein are visible a lower tang feature and sealant reservoir feature of the battery contact mechanism.

Broadly, the battery contact mechanism 10 comprises the single-piece battery contact spring 12; a post or rib projection 28; and a sealant reservoir 30. As illustrated, the spring 12 includes a center portion 34; an upper tang 36; and a lower tang 38. The spring 12 provides improved contact characteristics with both the battery 24 and the electronic componentry 20. The spring 12 may be constructed from a single piece of any suitable electrically-conductive material, such as, for example, full hard cold-rolled stainless steel type 301 having a minimum Brinell hardness of approximately 382 and a thickness of approximately 0.12 mm or approximately between 0.09 mm and 0.15 mm. Where there is more than one battery, a separate instance of the spring is provided for each of the one or more batteries, as seen in FIG. 3 wherein two lower tangs are shown indicating two of the springs. Alternatively, the mechanism may be adapted to accommodate more than one battery by elongating the center portion and providing a plurality of upper and lower tangs extending therefrom.

The center portion 34 is adapted to securely attach to the post projection 28 and to support and maintain the upper and lower tangs 36,38 in their normal operating orientation and condition. As illustrated, the center portion 34 is preferably substantially flat or planar. The center portion 34 includes a toothed opening 40 adapted to fit over and securely engage the post projection 28. More specifically, the teeth 42 of the opening 40 bend to allow the post projection 28 to enter the opening 40, but bite, dig into, or otherwise physically engage the post projection 28 to prevent it from thereafter being withdrawn from the opening 40. The post projection 28 may be an integral part of the housing 16 or merely attached thereto, and may be constructed from any suitable material, such as, for example, plastic.

The upper tang 36 extends from the center portion 34 into the battery compartment 22 and is adapted to achieve and maintain spring-biased physical contact with the battery 24. When not bent or compressed by contact with the battery 24, the upper tang 36 projects from the center portion 34 at an angle of approximately 16°, or approximately between 12° and 20°. The upper tang 36 may present a stop or limiter 46 that functions to limit the amount by which the upper tang 36 may be compressed by the battery 24. More specifically, the battery 24 pushing against the upper tang 36 forces the upper tang 36 back toward the center portion 34 up to a maximum extent allowed for by the limiter 46, with the maximum extent being reached when the limiter 46 contacts the post projection 28 or the center portion 34. A cutout 47 may be provided in the limiter 46 to accommodate the post projection 28. The limiter 46 is formed by bending the free end of the upper tang 36 back toward the center portion 34.

The lower tang 38 extends from the center portion 34 into the main compartment 18 and is adapted to achieve and maintain spring-biased physical contact with the electronic componentry 20. When not bent or compressed by contact with the electronic componentry 20, the lower tang 38 projects from the center portion 34 at an angle of approximately 125°, or approximately between 95° and 155°. The lower tang 38 may present a pad 48 that functions to increase surface area contact with the electronic componentry 20. More specifically, the electronic componentry 20 pushing against the lower tang 38 forces the pad 48 into a compressed state against the electronic componentry 20 so as to achieve increased surface area contact therewith and enhance electrical conductivity. The pad 48 is formed by bending the free end of the lower tang 38 as required to bring the pad 48 into maximum contact with the electronic componentry 20.

The sealant reservoir 30 provides improved moisture resistance by allowing for substantially surrounding at least a portion of the lower tang 38 with a sealant material. More specifically, the sealant reservoir 30 is a pocket or other substantially defined space through which the lower tang 38 extends and which can be filled with the sealant material so as to avoid or substantially eliminate leaks between the battery compartment 22 and the main compartment 18 that might otherwise damage the electronic componentry 20.

In exemplary use and operation, the battery contact mechanism 10 of the present invention functions as follows. The opening 40 of the center portion 34 of the spring 10 is forced onto the post projection 28 so that the teeth 42 of the opening 40 bend outwardly and thereafter engage the post projection 28 and prevent its withdrawal. The upper tang 36 extends into the battery compartment 22 and is in an uncompressed state; similarly, the lower tang 38 extends into the main compartment 18 and is in an uncompressed state. The sealant material is then applied or otherwise introduced into the sealant reservoir 30 through which the lower tang 38 extends, thereby substantially sealing the main compartment 18 from the battery compartment 22 to prevent moisture or other undesirable substances leaking therebetween. Next, the electronic componentry 20 is forced against the lower tang 38, thereby compressing the lower tang 38 and bringing the pad 48 into proper physical contact with the electronic componentry 20. Lastly, the battery 24 is placed into the battery compartment 22, compressing the upper tang 36 and forcing it back toward the center portion 34.

Figure 5:
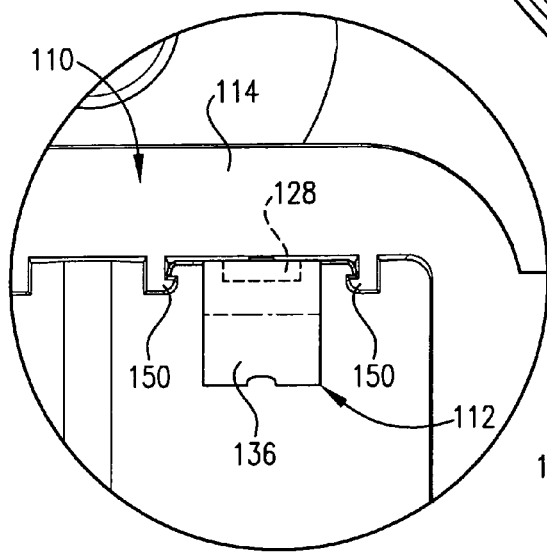
FIG. 5 is an enlarged front view of the battery contact spring component of the second preferred embodiment mounted within a housing of an electronic device.
Figure 4:
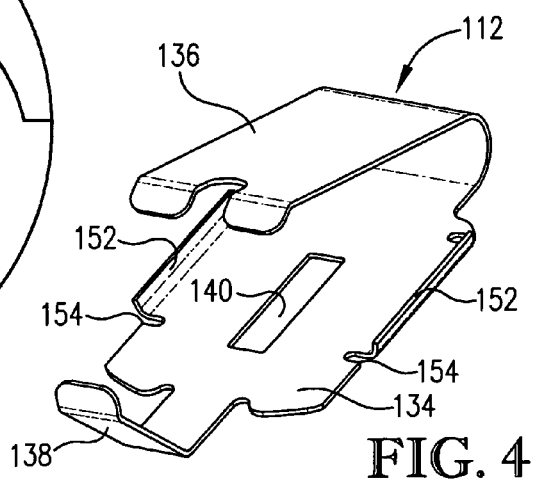
FIG. 4 is an isometric view of a battery contact spring component of a second preferred embodiment of a battery contact mechanism of the present invention.

A second preferred embodiment of the present invention illustrated in FIGS. 4 and 5 is substantially similar to the first preferred embodiment, except that a battery contact mechanism 110 comprises a single-piece battery spring 112; a post or rib projection 128; a sealant reservoir (not shown in FIGS. 4 and 5); and two pairs of L-shaped securing brackets 150 positioned proximate to and on opposing sides of the post projection 128 (only a front bracket of each pair of brackets 150 can be seen in FIG. 4). The battery contact mechanism 110 provides the same features as the battery contact mechanism 10 and is ideally configured for incorporation in substantially any battery-powered device 114.

As illustrated in FIG. 4, the single-piece battery contact spring 112 includes a center portion 134; an upper tang 136; and a lower tang 138. Similar to the first preferred embodiment, the spring 112 may be constructed from a single piece of any suitable electrically-conductive material. The center portion 134 of the spring 112 is adapted to fit around the post projection 128 and to securely snap or mate within the securing brackets 150, as described in more detail below. Once mounted within the battery-powered device 114, the spring 112 supports and maintains the upper and lower tangs 136,138 in their normal operating orientation and condition, similar to the first preferred embodiment.

The center portion 134 of the spring 112 is preferably substantially flat or planar and includes an opening 140 that is preferably smoothed-edged and sized to fit over and surround the post projection 128. The center portion 134 also includes upturned flanges 152 positioned on opposing sides of the center portion 134. The upturned flanges 152 are preferably flexible and are operable to be biased in opposing transverse directions and opposing longitudinal directions for facilitating mounting the spring 112 in the battery-powered device 114, as discussed below. The flexibility of the upturned flanges 152 is partially due to a pair of notches 154 formed on opposing sides of each flange 152, as best illustrated in FIG. 4.

To mount the spring 112 in the device 114, the opening 140 in the center portion 134 is positioned around the post projection 128. The pairs of L-shaped brackets 150 are selectively spaced so that the upturned flanges 152 snap into position and are held by the brackets 150, as best illustrated in FIG. 5. Due to the flexibility of the flanges 152, when mounting the spring 112, the flanges 152 bias away from the brackets 150, allowing the center portion 134 of the spring 112 to fit between the brackets 150. Once the flanges 152 have cleared the brackets 150, the flanges 152 bias towards the brackets 150, allowing the flanges 152 to frictionally secure within the brackets 150.

From the preceding description it will be appreciated that the battery contact mechanism 10,110 of the present invention provides a number of substantial advantages over the prior art, including, for example, a more reliable, rugged and water resistant connection between the battery and electronic componentry within the battery-powered device 14,114. More specifically, the spring 12,112 is constructed from a single piece of material, rather than the solder-connected plate, wire, and pad of the prior art, and therefore substantially eliminates problems arising from joint failure. Furthermore, the spring 12,112 is secured within the housing by the teeth of the toothed opening engaging the post projection, as in the first preferred embodiment, or by the upturned flanges positioned between the L-shaped securing brackets, as in the second preferred embodiment, thereby avoiding problems arising from the spring becoming loose within the housing. Additionally, the sealant reservoir allows for substantially sealing the main compartment from the battery compartment, thereby avoiding leakage therebetween.

Although the present invention is described herein with reference to the preferred embodiment(s) illustrated in the drawings, it is noted that equivalents may be employed and substitutions made without departing from the reasonable and contemplated scope of the present invention as recited in the claims. In particular, the battery-powered device into which the battery contact mechanism of the present invention may be incorporated may be substantially any battery-powered device, and is not limited to those particular devices discussed herein or shown in the figures.

Having thus described the preferred embodiment of the invention, what is claimed as new and desired to be protected by Letters Patent includes the following:

The invention claimed is:

1. A battery contact spring comprising:
   a center portion, wherein the center portion includes an opening and one or more bendable teeth projecting into the opening so as to allow for receiving a projection within the opening and thereafter engaging the projection so as to prevent inadvertent withdrawal of the projection from the opening, wherein the projection extends through the opening;
   an upper tang extending at an acute angle from the center portion and maintaining physical contact with a battery; and
   a lower tang extending at an obtuse angle from the center portion and maintaining physical contact with electronic componentry to be powered by the battery,
   wherein the battery contact spring is constructed from a single piece of electrically conductive material.

2. The battery spring as set forth in claim 1, wherein the upper tang extends from the center portion at an angle of approximately between 11°–21°.

3. The battery spring as set forth in claim 1, wherein a free end of the upper tang presents a limiter for limiting compression of the upper tang when in physical contact with the battery.

4. The battery spring as set forth in claim 1, wherein the lower tang extends from the center portion at an angle of approximately between 95°–155°.

5. The battery spring as set forth in claim 1, wherein a free end of the lower tang presents a pad for increasing surface area contact with the electronic componentry.

6. The battery contact spring as set forth in claim 1, further including a sealant reservoir through which a portion of the battery contact spring extends, the sealant reservoir being fillable with a sealant material so as to prevent passage of moisture.

7. The battery contact spring as set forth in claim 1, further including a sealant reservoir through which the lower tang of the battery contact spring extends, the sealant reservoir being fillable with a sealant material so as to prevent passage of moisture.

8. A battery contact spring for transferring electrical power between a battery and electronic componentry within a housing of a hand-held electronic device, the battery contact spring comprising:
- a center portion including an opening and one or more bendable teeth projecting into the opening so as to allow for receiving a projection associated with the housing within the opening and thereafter engaging the projection so as to prevent inadvertent withdrawal of the projection from the opening and thereby secure the battery contact spring within the housing, wherein the projection extends completely through the opening;
- an upper tang extending angularly from the center portion and maintaining physical contact with the battery; and
- a lower tang extending angularly from the center portion and maintaining physical contact with the electronic componentry to be powered by the battery,
- wherein the battery contact spring is constructed from a single piece of electrically conductive material.

9. The battery spring as set forth in claim 8, wherein the upper tang extends from the center portion at an angle of approximately between 11°–21°.

10. The battery spring as set forth in claim 8, wherein a free end of the upper tang presents a limiter for limiting compression of the upper tang when in physical contact with the battery.

11. The battery spring as set forth in claim 8, wherein the lower tang extends from the center portion at an angle of approximately between 95°–155°.

12. The battery spring as set forth in claim 8, wherein a free end of the lower tang presents a pad for increasing surface area contact with the electronic componentry.

13. The battery contact spring as set forth in claim 8, further including a sealant reservoir through which a portion of the battery contact spring extends, the sealant reservoir being fillable with a sealant material so as to prevent passage of moisture.

14. The battery contact spring as set forth in claim 8, further including a sealant reservoir through which the lower tang of the battery contact spring extends, the sealant reservoir being fillable with a sealant material so as to prevent passage of moisture.

15. A battery contact spring for transferring electrical power between a battery and electronic componentry within a housing of a hand-held electronic device, the battery contact spring comprising:
- a center portion including an opening and a plurality of bendable teeth projecting into the opening so as to allow for receiving a projection associated with the housing within the opening and thereafter engaging the projection so as to prevent inadvertent withdrawal of the projection from the opening and thereby secure the battery contact spring within the housing, wherein the projection extends completely through the opening such that the projection extends from a first side of the center portion beyond a second side of the center portion;
- an upper tang extending at an angle of approximately between 11°–21° from the center portion and maintaining physical contact with the battery, wherein a free end of the upper tang presents a limiter for limiting compression of the upper tang when the upper tang is in physical contact with the battery; and
- a lower tang extending at an angle of approximately between 95°–155° from the center portion and maintaining physical contact with the electronic componentry, wherein a free end of the lower tang presents a pad for increasing surface area contact with the electronic componentry to be powered by the battery,
- wherein the battery contact spring is constructed from a single piece of electrically conductive material.

16. The battery contact spring as set forth in claim 15, further including a sealant reservoir through which a portion of the battery contact spring extends, the sealant reservoir being fillable with a sealant material so as to prevent passage of moisture.

17. The battery contact spring as set forth in claim 15, further including a sealant reservoir through which the lower tang of the battery contact spring extends, the sealant reservoir being fillable with a sealant material so as to prevent passage of moisture.

18. A battery contact mechanism for transferring electrical power between one or more batteries and electronic componentry in a hand-held electronic device, the battery contact mechanism comprising:
- a projection associated with a housing of the hand-held electronic device;
- a battery contact spring comprising:
  - a center portion including an opening and one or more bendable teeth projecting into the opening so as to allow for receiving the projection within the opening and thereafter engaging the projection so as to prevent inadvertent withdrawal of the projection from the opening and thereby securing the battery contact spring within the housing,
  - an upper tang extending angularly from the center portion and maintaining physical contact with a battery, and
  - a lower tang extending angularly from the center portion and maintaining physical contact with an electronic componentry to be powered by the battery,
  - wherein the battery contact spring is constructed from a single piece of electrically conductive material; and
- a sealant reservoir through which the lower tang of the battery contact spring extends, the sealant reservoir being fillable with a sealant material so as to prevent passage of moisture.

19. The battery spring as set forth in claim 18, wherein the upper tang extends from the center portion at an angle of approximately between 11°–21°.

20. The battery spring as set forth in claim 18, wherein a free end of the upper tang presents a limiter for limiting compression of the upper tang when in physical contact with the battery.

21. The battery spring as set forth in claim 18, wherein the lower tang extends from the center portion at an angle of approximately between 95°–155°.

22. The battery spring as set forth in claim 18, wherein a free end of the lower tang presents a pad for increasing surface area contact with the electronic componentry.

* * * * *